Feb. 18, 1947.    C. M. OSTERHELD    2,415,964
WATER HEATER THERMOSTAT AND CUT-OUT
Filed March 20, 1944
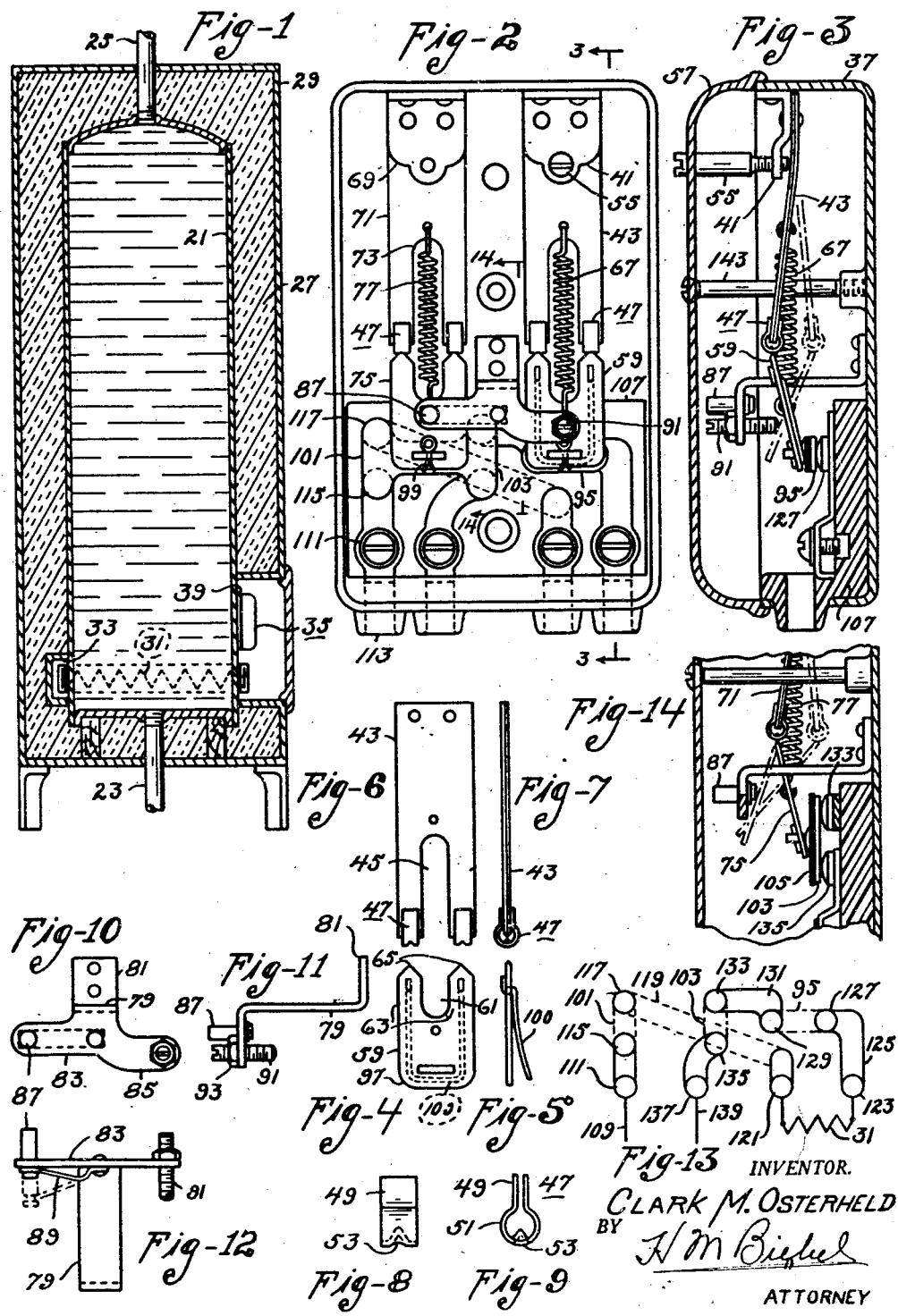
INVENTOR.
CLARK M. OSTERHELD
BY
ATTORNEY Patented Feb. 18, 1947

2,415,964

UNITED STATES PATENT OFFICE 2,415,964

WATER HEATER THERMOSTAT AND CUT-OUT

Clark M. Osterheld, Stoughton, Wis., assignor to McGraw Electric Company, Elgin, Ill., a corporation of Delaware Application March 20, 1944, Serial No. 527,303

12 Claims. (Cl. 200—138)

My invention relates to thermostatic heater circuit control means and particularly to a thermostatic temperature control switch mechanism and a thermostatic temperature limit switch mechanism.

One object of my invention is to provide a combination temperature control and temperature limit unit in a casing adapted to be mounted in heat-receiving relation on a tank, the electric heater of which is to be controlled.

Another object of my invention is to provide a combination snap acting temperature control and a snap acting temperature limit unit in which the temperature control mechanism will operate with a relatively small temperature differential and in which the temperature limit mechanism must be reclosed manually after removal of the cover of the casing.

Another object of my invention is to provide a combination snap acting temperature control and a snap acting temperature limit unit in which the temperature control mechanism will open one side of a circuit and in which the temperature limit mechanism will open both sides of the circuit.

Other objects of my invention will either be apparent from a description of one form of device embodying my invention or will be pointed out in the course of such description and set forth in the appended claims.

In the drawing,

Figure 1 is a vertical, sectional view through a domestic hot water tank having operatively associated therewith a device embodying my invention, Fig. 2 is a front plan view of a combination temperature control and temperature limit switch unit embodying my invention with the cover of the casing removed, Fig. 3 is a view in longitudinal section taken on the line 3—3 of Fig. 2, Fig. 4 is a top plan view of the second bimetal bar, Fig. 5 is a side view thereof, Fig. 6 is a top plan view of the main bimetal bar, Fig. 7 is a side view thereof, Fig. 8 is an enlarged top plan view of a pivot plate, Fig. 9 is an enlarged side view thereof, Fig. 10 is a top plan view of a stop member, Fig. 11 is a side elevational view thereof, Fig. 12 is a front elevational view thereof, and Fig. 13 is a diagram of the electrical connections of my device.

Fig. 14 is a fragmentary, sectional view on line 14—14 of Fig. 2.

Referring, first of all to Fig. 1 of the drawing I have there illustrated a domestic hot water tank 21 having a lower cold water inlet pipe 23, an upper hot water outlet pipe 25, heat-insulating material 27 therearound, this latter material being held in proper operative position around the tank by an outer casing 29.

I provide preferably, but not necessarily, a single electric heater 31, which I have shown as being clamped around and against the outside of the tank 21 and being positioned in a tunnel 33. All of these details are well known in the art and constitute no part of my present invention.

When using an electric heater, such as heater 31, to heat up the water in the tank, it is desirable, if not necessary, to provide a temperature control switch, which is preferably positioned in heat-receiving relation relatively to the tank adjacent the lower end portion so that the thermal temperature control switch will be in closed position in case of the presence of cold water in the lower end portion of the tank and will be in open position in case substantially all of the tank is full of hot water. By cold water I mean water the temperature of which is on the order of 65° to 70° F., while by hot water I mean water the temperature of which is on the order of 150° F. or slightly higher. Further, it is necessary to provide a temperature limit means, of some kind, and where an electric heater provides the heat necessary to raise the temperature of the water, I prefer to provide a thermostatic temperature limit switch, namely one which will remain in closed position at all temperatures below a predetermined maximum value, which value may be on the order of 195° F. or thereabouts. The temperature limit switch will therefore remain in closed position until for some reason or other the temperature control switch fails to operate properly with the attendant result of increase of temperature beyond 150° F. when the temperature limit switch mechanism is called upon to act.

I have shown a combined temperature control and temperature limit thermostatic mechanism, designated by numeral 35 as comprising a casing 37 which I preferably make of a high heat-conducting metal or alloy, such as aluminum. While I have shown the bottom wall of casing 37 as substantially flat, it is to be understood that it may be secured against a block 39, also of high heat-conducting material, which block has an inner arcuate surface adapted to conform with and engage the outer arcuate surface of tank 21 and secured thereagainst as by welding.

In the casing 37 I provide a first bracket of heat-conducting material 41, of substantially L-shape, which is adapted to be secured against an end wall of casing 37 in any suitable or desired manner. A first bimetal bar 43 has an end portion secured to bracket 41 as by rivets or in any other suitable or desired manner, so that the other part will extend away from the bracket 41. Bimetal bar 43 is provided with a central longitudinal slot 45 extending inwardly from the free end of bar 43 to substantially the mid-portion thereof. I provide a pivot plate 47 mounted on each of the legs of bar 43, which includes two substantially straight flat end portions 49 and an integral central or mid-portion 51, of arcuate shape, having an indentation 53 therein for a purpose which will hereinafter appear. Bar 43 may be adjusted relatively to its support 41 as by a rod 55, the inner reduced end of which has screw threaded engagement with bracket 41, rod 55 extending outwardly through an opening in cover member 57 so that it may be manually adjusted by the user of the device to vary the actual temperature of the hot water, in case the user should desire to change the maximum temperature of the hot water.

A second bimetal bar 59 which is relatively shorter than the first or main bimetal bar 43 and which may be thinner than the first bimetal bar, is provided with a central extended slot 61 in its inner end. The two outside legs 63 of the second bimetal bar 59 have sharpened end portions 65, as will be seen in Fig. 4 of the drawing, the sharpened end portion 65 being adapted to fit into the indentations 53 in the pivot plates 49 hereinbefore described.

An over-center spring 67 is located in the alined slots 45 and 61 of the first and second bimetal bar, the ends of the spring being connected with the intermediate portions of the bimetal bars adjacent the inner ends of the respective slots, the combination of the two bimetal bars and the spring constituting a toggle having the characteristic snap acting movement of one of the arms, namely the second bimetal bar 59, from one operating position to the opposite limiting position. I wish to point out that the high expansion component of the two bimetal bars is on the same side of the assembly.

For the temperature limit switch mechanism I provide a second bracket 69 also of substantially L-shape, secured to the same end wall of the casing supporting the first bracket 41. I provide a heavier or thicker bimetal bar 71 having one end secured to bracket 69 as by rivets or short machine screws. Bimetal bar 71 has secured to its outer ends pivot plates 47 substantially the same as were hereinbefore described. Bimetal bar 71 is provided with an extended slot 73 at its free end. A second bimetal bar 75, which may be of substantially the same kind and thickness of bar, as well as shape, as is the second bimetal bar 59, is provided, an over-center spring 77 being positioned in the alined slots and having its ends connected with the first and second bimetal bars.

While I have shown two brackets, to which the ends of the two main bimetal bars are secured, I do not wish to be limited thereto, as I may secure the ends of these bimetal bars directly to the one wall of the casing and use the bracket 41 as a support for the adjusting screw 55.

In Figs. 10 to 12 inclusive I have shown a stop member 79 for the two switch mechanisms hereinbefore described; stop member 79 is of substantially Z-shape having one end portion 81 adapted to be secured against the inside surface of the bottom wall of casing 37. The upper end portion of member 79 has two arms 83 and 85 extending laterally thereof, arm 83 having secured therein a manually-adjustable reset member 87 which is normally held, as by a spring 89, in a position relative to arm 83 such that a greater part of its length is positioned above arm 83. Arm 85 has positioned therein an adjustable stop screw 91, which latter has mounted thereon a lock nut 93 to permit of holding the stop screw 91 in any desired position relatively to arm 85. Movement of stop screw 91 will permit of varying the temperature differential of operation of the bimetal bar 43, that is, turning the screw 91 to reduce the distance between it and contact members 127 and 129 will reduce the change of temperature necessary to cause movement of the switch from one of its positions to the other.

The free outer end of the second bimetal bar 59 of the temperature control switch mechanism has loosely insulatedly mounted thereon a contact bridging member 95, the insulating member of which has a small upper extension adapted to fit into and extend through an opening 97 in bimetal bar 59, a small cotter pin 99 extending through the member to hold it in proper operative position relatively to the bimetal bar 59. A U-shaped wire spring 100 extends along the underside of member 59 and has its end portions extending through openings in member 59 to hold it in proper operative position thereon. The intermediate portion of spring 100 is normally out of engagement with the under surface of member 59 and rests against contact bridging member 95 to hold the latter as far away from member 59 as may be permitted by cotter pin 99. Spring 100 will tend to prevent rebound of the contact bridging member 95 and will cushion it when moved with a snap action into engagement with the fixed contact members 127 and 129.

Another action of the auxiliary spring 100 is that it will tend to maintain an appreciable contact pressure between contact bridging member 95 and the fixed contact members 127 and 129 when the temperature of the bimetal toggle arms is being reduced. Such change of temperature causes the two toggle arms to extend more nearly into straight line alinement with each other until the instant of separation of the bridging member from the contact members, when the contact pressure is a minimum. The auxiliary spring 100 will tend to maintain an appreciably greater contact pressure until the instant of disengagement of the bridging member from the contact members.

The second bimetal bar 75 of the temperature limit switch mechanism has secured thereto a pair of contact bridging members 101 and 103, both of these bridging members being suitably secured to a supporting member 105 of electric-insulating material, which is held in proper operative engagement with the outer free end of bimetal bar 75 in substantially the same manner as above recited for the support mounted on the first bimetal bar 59.

I have shown, in Fig. 13, a plurality of contact terminals and contact members, all of which are supported on a block 107 of electric-insulating material suitably secured against the bottom wall of the casing and an end wall of the casing. An electric supply circuit conductor 109 may be connected to a terminal 111, entering the casing through an extended bushing 113 of electric-insulating material. The terminal 111 is connected to a fixed contact 115 adapted to be engaged by contact bridging member 101, which latter at the same time engages a second fixed contact member 117. Contact member 117 is adapted to be connected by a suitable conductor 119 with a contact terminal 121 which is connected to one terminal of the electric heater 31. The other terminal of heater 31 is connected to a second contact terminal 123, which latter is connected by a suitable conductor 125 to a fixed contact 127, which latter is adapted to be engaged by contact bridging member 95. A contact 129 is also adapted to be engaged by bridging member 95, and this latter fixed contact 129 is connected by a conductor 131 with a fixed contact member 133 adapted to be engaged by the second contact bridging member of the temperature limit mechanism. Another fixed contact member 135, adapted to be engaged by bridging member 103 is connected to a contact terminal 137 to which the other supply circuit conductor 139 may be attached.

The casing 37 is provided with a cover 57, which may be held in proper operative position thereon as by a machine screw 143 extending therethrough and having screw threaded engagement with the bottom wall of the casing.

It is obvious that with the combination temperature control and temperature limit switch mechanisms housed in the casing 37 secured to the outside surface of a tank adjacent the lower end thereof, the bimetal bars 43 and 71 of the two switch mechanisms will be subjected to the temperature of the water in the tank near the lower end portion thereof. Thus, if the lower end portion of the tank is filled with cold water, the thermostatic bar 43 will have a temperature on the order of 65° to 70° F. so that the contact bridging member 95 will be in engagement with the fixed contact members 127 and 131. The temperature limit mechanism and particularly the main bimetal bar 71 will also be subject to the same temperature with the result that contact bridging members 101 and 103 will also be in engagement with their cooperative fixed contact members, with the result that current will flow from the supply circuit conductors 109 and 139 through the two switch mechanisms as well as through the heater 31, so that heating up of the water will take place.

It is further obvious that when substantially all of the water in the tank has been heated to a temperature on the order of 150° F., the contact bridging member 95 will be moved out of engagement with contact members 127 and 131 to de-energize heater 31 and that this will interrupt connection of heater 31 with the supply circuit conductors in only one side of the circuit.

If now, because of some fault, the temperature control switch mechanism should fail to operate properly, with attendant rise of temperature of the water in the tank to a higher value, say on the order of 195° F., then the temperature limit switch mechanism will operate and will move from the position shown in full lines in Fig. 14 to the position shown in broken lines in that figure, bimetal bar 71 having moved closer to the base of casing 37 while bar 75 has been moved into engagement with stop member 87. The design, construction, and adjustment of the temperature limit switch mechanism is such that when the contact bridging members 101 and 103 have been moved out of engagement with their cooperating fixed contact members, with resultant ultimate decrease of temperature of the tank water and of bimetal bar 71 to a value on the order of 65° or 70° F. and movement of bimetal bar 71 to the position shown in full lines in Fig. 14, the bimetal bar 75 will not move back to its circuit closing position, but will remain in engagement with reset member 87. It is then necessary for an operator or representative of the electric utility company to visit the installation, determine and remedy the cause of the trouble, and then manually reclose the temperature switch mechanism by manual pressure on reset member 87 or by pressure on the bimetal bar 75.

As has already been hereinbefore set forth, the thickness of the second bimetal bar 59 of the temperature control switch mechanism is less than that of the first bimetal bar of the same switch mechanism. The thickness of the main bimetal bar of the temperature control switch mechanism may be on the order of .025", while the thickness of the second bimetal bar may be on the order of .015". The thickness of the main bimetal bar 71 of the temperature limit switch mechanism may be on the order of .070", while the thickness of the second bimetal bar 75 may be on the order of .015" or slightly thicker. The temperature control switch mechanism is so designed, constructed, and adjusted that the temperature differential necessary to cause it to move from one to the other of its operative positions is on the order of say 10° F. As has already been hereinbefore stated, the temperature limit switch mechanism is so designed, constructed, and adjusted that, once having opened at 195° F., it will remain in open position until it is manually reclosed.

The combination device embodying my invention thus provides relatively simple temperature control and temperature limit mechanisms, each of which operates with a snap action, is positioned in a common casing, has a number of contact members in common, and in which the temperature control switch opens one side of the supply circuit, while the temperature limit mechanism opens both sides of the circuit of the electric heater.

While I have illustrated and described the device embodying my invention as applied to a hot water tank, it is evident that its use is not limited thereto, but that it may be used in the control of other electric heaters.

Various modifications may be made in the device embodying my invention without departing from the spirit and scope thereof, and all such modifications coming clearly within the scope of the appended claims shall be considered a part of my invention.

I claim as my invention:

1. A control device for an electric circuit including an electric heater for a hot water tank, comprising a casing of heat-conducting material, a thermal snap-acting temperature control switch mechanism including a pair of longitudinally-abutting bimetal bars and an over-center spring connected to said bars to cause one of them to move between two limiting positions with a snap action, a thermal snap-acting temperature limit switch mechanism including a pair of longitudinally-abutting bimetal bars and an over-center spring connected to said bars to cause one of them to move between two limiting positions with a snap action, cooperating fixed contact members supported by said casing and movable contact members supported by said thermal switch mechanisms to cause the control switch mechanism to open one side of the electric circuit and to cause the limit switch mechanism to open both sides of the electric circuit, said fixed contact members defining one limiting position and stop means supported by said casing defining the other limiting positions.

2. A control device for an electric circuit including an electric heater for a hot water tank, comprising a casing of heat-conducting material adapted to be mounted on a tank in heat-receiving relation therewith, a snap-acting temperature control switch mechanism including a first bimetal bar, a second bimetal bar or lesser thickness than said first bar pivotally abutting said first bar in end-to-end relation, an over-center spring connected to said two bars to cause snap-acting movement of said second bar between two opposite limiting positions under relatively small changes of temperature, a snap-acting temperature limit switch mechanism including a third bimetal bar having a greater thickness than said first bar, a fourth bimetal bar of lesser thickness than said first bar pivotally abutting said third bar in end-to-end relation, an over-center spring connected to said third and fourth bars to cause snap-acting movement of said fourth bar between two limiting positions under relatively large change of temperature, a contact member on said second arm, a pair of contact members on said fourth bar, a plurality of cooperating contact members fixedly insulatedly supported by said casing and effective to cause opening of one side of said circuit by said temperature control mechanism and opening of both sides of said circuit by said temperature limit mechanism, said fixed contact members defining one limiting position and means supported by said casing defining the second limiting position.

3. A control device for an electric circuit including an electric heater for a hot water tank, comprising a casing of heat-conducting material adapted to be mounted in heat-receiving relation on the tank, a pair of heat-conducting brackets secured to one wall of said casing, a snap-acting temperature control switch mechanism including a first bimetal bar having one end secured to one of said brackets, a second bimetal bar of lesser thickness than said first bar having one end in pivotal abutment with the other end of said first bar, an over-center spring connected to said first and second bars to cause snap-acting movement of the other end of said second bar into either one of two limiting positions under relatively small changes of temperature, and adjusting means for varying the operating temperature of said control switch mechanism supported by said one bracket and manually-adjustable from the outside of the casing, a snap-acting temperature limit switch mechanism including a third bimetal bar having a greater thickness than said first bar and having one end secured to the second bracket, a fourth bimetal bar of lesser thickness than said first bar having one end in pivotal abutment with the other end of said third bar, an over-center spring connected to said third and fourth bars to cause snap-acting movement of the other end of said fourth bar from closed to open position upon subjection to a temperature appreciably greater than that required to operate the temperature control mechanism, cooperating contact members supported by said casing and by the other ends of said second and fourth bars to open one side of said circuit by the temperature control mechanism and to open both sides of said circuit by said temperature limit mechanism.

4. In a combination temperature control and temperature limit switch assembly, a heat-conducting casing, a first relatively thin bimetal bar having one end operatively secured to one wall of the casing, a second bimetal bar substantially thinner than said first bar having end portions pivotally operatively engaging the other end of said first bar, an over-center spring having its ends connected to said bars to form a snap-acting mechanism of relatively small differential of temperature changes, a single contact member on the free end of said second bar, a third relatively thick bimetal bar having one end operatively secured to one wall of the casing, a fourth bimetal bar of substantially the same thickness as said first bar having end portions pivotally operatively engaging the other end of said third bar, an over-center spring having its ends connected to said third and fourth bars to form a snap-acting mechanism, a pair of contact members on the free end of said fourth bar, a block of electric-insulating material in said casing, a plurality of contact members on said block cooperating with said contact members on said second arm to control one side of a circuit and with the contact members on said fourth arm to control two sides of a circuit, said contact members on said block being adapted to form stop members for said second and fourth arms and a second stop means for said second and fourth arms secured to said casing.

5. A thermally-actuable control switch, comprising a casing of heat-conducting material, a first bimetal bar having one end operatively supported by said casing and having its other end of U-shape, a second bimetal bar having a U-shaped end operatively pivotally engaging the U-shaped end of said first bimetal bar, an over-center spring positioned in said ends of U-shape and connected to said first and second bimetal bars to cause snap-acting movement of the outer end of said second bar under changes of temperature and a contact member loosely insulatedly mounted at the outer end of said second bar.

6. A thermally-actuable control switch, comprising a casing of heat-conducting material, a bracket secured to an end wall of said casing, a first bimetal bar having one end secured to said bracket and having its other end of U-shape, a second bimetal bar having a U-shaped end operatively pivotally engaging the U-shaped end of said first bimetal bar, an over-center spring positioned in said ends of U-shape and connected to said first and second bimetal bar to cause snap-acting movement of the outer end of said second bar under changes of temperature, a contact member loosely insulatedly mounted at the outer end of said second bar and manual adjusting means supported by said bracket for varying the operating temperature of the switch.

7. A control switch for an electric heater of a hot water tank, comprising a casing of heat-conducting material adapted to be mounted in heat-receiving relation on a tank, a first bimetal bar having one end operatively supported by said casing and having its movable end of substantially U-shape, a second bimetal bar having one U-shaped end pivotally operatively engaging the U-shaped end of said first bimetal bar, the high expansion component of both bimetal bars being on the same side of the assembly, an over-center spring positioned in the ends of U-shape and connected to said bimetal bars to cause snap-acting movement of the outer end of said second bimetal bar with relatively small changes of temperature and a contact member loosely insulatedly mounted at the outer end of the second bar.

8. In a thermal switch, a heat conducting casing, a snap-acting mechanism including a first toggle arm of bimetal, a second toggle arm of bimetal, said toggle arms having operatively engaging ends of U-shape, an over-center spring having its ends connected to said toggle arms to cause one of said arms to move between two opposite limiting positions with a snap action, a bracket on said casing for supporting the other end of said first toggle arm stop means defining the two limiting positions of said one toggle arm, means supported by said bracket for manually adjusting said first toggle arm to vary the operating temperature of the snap acting mechanism and switch means including a contact carried loosely on the free end of said second toggle arm.

9. In a thermal temperature control switch, a casing of heat-conducting material, a bracket secured to the inside of one wall of the casing, a snap-acting switch mechanism including a first bimetal toggle arm having one end fixedly secured to the bracket, the other end of said arm being of U-shape, a pivot plate on each of the legs of the other end of the first arm having an indentation therein, a second bimetal toggle arm having an inner end of U-shape with sharp-pointed end portions to fit into the indentations in said pivot plates, an over-center spring positioned in said abutting ends of U-shape connected to said first and second toggle arms to cause snap-acting movement of the outer end of the second arm under relatively small changes of temperature into either of two limiting positions, stop means supported by the bottom wall of said casing to define said two limiting positions and a contact loosely supported on the free end of the second toggle arm.

10. A control device for an electric circuit including an electric heater for a hot water tank, comprising a casing of heat-conducting material adapted to be mounted on a tank in heat-receiving relation therewith, a thermal snap-acting temperature control mechanism in said casing adapted to open and close one side of said circuit, a thermal snap-acting temperature limit mechanism including a first bimetal bar having one end fixedly supported by said casing and having a U-shaped other end, a pivot plate on each of the legs of the other end having an indentation therein, a second bimetal bar having one end of U-shape with sharp-pointed ends to fit into the indentations in said pivot plates, an over-center spring connected to said two bimetal bars to cause snap-acting movement of the outer end of said second bar from closed to open position upon subjection to a predetermined temperature, a pair of contact members closely insulatedly supported by the other end of said second bar and two pairs of contact members fixedly insulatedly supported by said casing adapted upon disengagement from said contact members supported by said second bar to open both sides of said circuit.

11. A thermally-actuable control switch, comprising a casing, a first bimetal bar having one end operatively supported by said casing and having its other end of U-shape, a second bimetal bar having a U-shaped end operatively pivotally engaging the U-shaped end of the first bimetal bar, an over-center spring positioned in said ends of U-shape and its ends connected to said first and second bimetal bars to cause snap-acting movement of the outer end of said second bar under changes of temperature, a fixed contact member, a second contact member loosely insulatedly mounted on said second bar at the outer end thereof adapted to be engaged with and disengaged from the fixed contact member with a snap action and spring means carried by said second bar operatively engaging said second contact member to prevent rebound thereof when moved into engagement with said fixed contact member.

12. A thermally-actuable control switch, comprising a casing, a first bimetal bar having one end operatively supported by said casing and having its other end of U-shape, a second bimetal bar having a U-shaped end operatively pivotally engaging the U-shaped end of the first bimetal bar, an over-center spring positioned in said ends of U-shape and its ends connected to said first and second bimetal bar to cause snap-acting movement of the outer end of said second bar under changes of temperature, a fixed contact member, a second contact member loosely insulatedly mounted on said second bar at the outer end thereof adapted to be engaged with and disengaged from the fixed contact member with a snap action and spring means carried by said second bar operatively engaging said second contact member to tend to maintain an appreciable contact pressure between said engaged contact members until snap-acting disengagement therebetween.

CLARK M. OSTERHELD.

REFERENCES CITED

The following references are of record in the file of this patent:

UNITED STATES PATENTS

| Number | Name | Date |
|---|---|---|
| 1,390,897 | Denison | Sept. 20, 1921 |
| 2,004,772 | Sonn | June 11, 1935 |
| 2,275,893 | Ettinger | Mar. 10, 1942 |
| 2,255,021 | Dillman | Sept. 2, 1941 |